(12) United States Patent
Studnicka

(10) Patent No.: US 11,301,310 B2
(45) Date of Patent: Apr. 12, 2022

(54) SHARED APPLICATION INTERFACE DATA THROUGH A DEVICE-TO-DEVICE COMMUNICATION SESSION

(71) Applicant: PAYPAL, INC., San Jose, CA (US)

(72) Inventor: Todd Studnicka, Omaha, NE (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 16/917,115

(22) Filed: Jun. 30, 2020

(65) Prior Publication Data

US 2020/0401464 A1 Dec. 24, 2020

Related U.S. Application Data

(63) Continuation of application No. 16/014,573, filed on Jun. 21, 2018, now Pat. No. 10,698,743.

(51) Int. Cl.
| | |
|---|---|
| *G06F 9/54* | (2006.01) |
| *G06Q 30/06* | (2012.01) |
| *G06Q 20/22* | (2012.01) |
| *G06F 3/0481* | (2013.01) |
| *H04L 12/58* | (2006.01) |
| *H04L 29/06* | (2006.01) |
| *G06F 3/04817* | (2022.01) |
| *H04L 51/56* | (2022.01) |

(Continued)

(52) U.S. Cl.
CPC ............ *G06F 9/54* (2013.01); *G06F 3/04817* (2013.01); *G06Q 20/227* (2013.01); *G06Q 30/0643* (2013.01); *H04L 51/046* (2013.01); *H04L 51/36* (2013.01); *H04L 65/4053* (2013.01)

(58) Field of Classification Search
CPC ..... G06F 3/04817; G06F 9/54; G06Q 20/227; G06Q 30/0643; H04L 51/36; H04L 51/046; H04L 65/4053
USPC ....................................................... 709/204
See application file for complete search history.

(56) References Cited

U.S. PATENT DOCUMENTS

| | | | | |
|---|---|---|---|---|
| 9,407,622 | B2 * | 8/2016 | Field-Eliot | .............. H04L 63/08 |
| 9,860,244 | B2 * | 1/2018 | Mardikar | ............ H04L 63/0838 |

(Continued)

OTHER PUBLICATIONS

Jyve, Jyve Skype Web Plugin, Feb. 8, 2006, https://web.archive.org/web/20060208033953/http:l/plugin.jyve.com/ (Year: 2006).

*Primary Examiner* — James E Springer
(74) *Attorney, Agent, or Firm* — Haynes and Boone, LLP

(57) ABSTRACT

There are provided systems and methods for shared application interface data through a device-to-device communication session. A user may utilize a device to engage in an electronic communication session with another user, such as a shared messaging or video chat session. During the session, the user may utilize another application on the same device to perform separate application data processing, such as accessing a website or an online marketplace that may include interface output data. The user may activate a plug-in or add-on that may allow application data sharing for current application data in the separate application during the communication session. The device may determine the present application data, such as a displayable instance of the current interface data, and may transmit the data to the other user's device through the communication session. Further, the plug-in may allow for split transaction and data processing.

20 Claims, 5 Drawing Sheets

(51) Int. Cl.
*H04L 65/4053* (2022.01)
*H04L 51/046* (2022.01)

(56) References Cited

U.S. PATENT DOCUMENTS

| | | |
|---|---|---|
| 2009/0172565 A1 | 7/2009 | Jackson et al. |
| 2009/0249216 A1 | 10/2009 | Charka et al. |
| 2010/0011103 A1* | 1/2010 | Luzzatti ............... H04N 21/632 |
| | | 709/226 |
| 2012/0185355 A1 | 7/2012 | Kilroy |
| 2013/0166445 A1 | 6/2013 | Isaacson et al. |
| 2013/0215116 A1 | 8/2013 | Siddique et al. |
| 2013/0218966 A1 | 8/2013 | Jakobson |
| 2013/0268331 A1 | 10/2013 | Bitz et al. |
| 2015/0006308 A1 | 1/2015 | Lin |
| 2015/0067181 A1 | 3/2015 | Roy et al. |
| 2015/0149916 A1 | 5/2015 | Mendez et al. |
| 2016/0063588 A1 | 3/2016 | Gadre et al. |
| 2016/0072858 A1 | 3/2016 | Heyne et al. |
| 2017/0091699 A1* | 3/2017 | Mueller ............. G06Q 20/3224 |
| 2017/0185368 A1 | 6/2017 | Handrigan et al. |
| 2017/0249394 A1 | 8/2017 | Loeb et al. |
| 2017/0295159 A1* | 10/2017 | Arora ..................... G06F 21/44 |
| 2018/0011678 A1 | 1/2018 | Shipper et al. |
| 2018/0174122 A1* | 6/2018 | Mattingly ............ G06Q 20/223 |
| 2018/0336553 A1 | 11/2018 | Brudnicki et al. |
| 2018/0375863 A1* | 12/2018 | Fan ....................... G06F 16/957 |

\* cited by examiner

SHARED APPLICATION INTERFACE DATA THROUGH A DEVICE-TO-DEVICE COMMUNICATION SESSION

CROSS REFERENCE

This application is a continuation of U.S. patent application Ser. No. 16/014,573, filed Jun. 21, 2018, which is hereby incorporated by reference in its entirety.

TECHNICAL FIELD

The present application generally relates to device specific instances of shared application interface data, and more specifically to cross-application interactions during a communication session to share application interface output for mutual interaction.

BACKGROUND

With modern mobile and computing devices, users may engage in direct communication sessions, including voice and video chat. These allow users to exchange data in real time and allow for instantaneous connections. However, these data exchanges are limited to the amount of data that may be captured through the data exchange session and the normal information that a person may convey to another person. For example, although voice or video chat may be capable of recording a person's voice, likeness, or a real-world event occurring at a location, such chat sessions are incapable of capturing other forms of on-device computing data. Moreover, video chats do not allow for shared data that may be simultaneously interacted with by users and/or provide separate instances for separate user interaction and online data processing.

Figure 1:
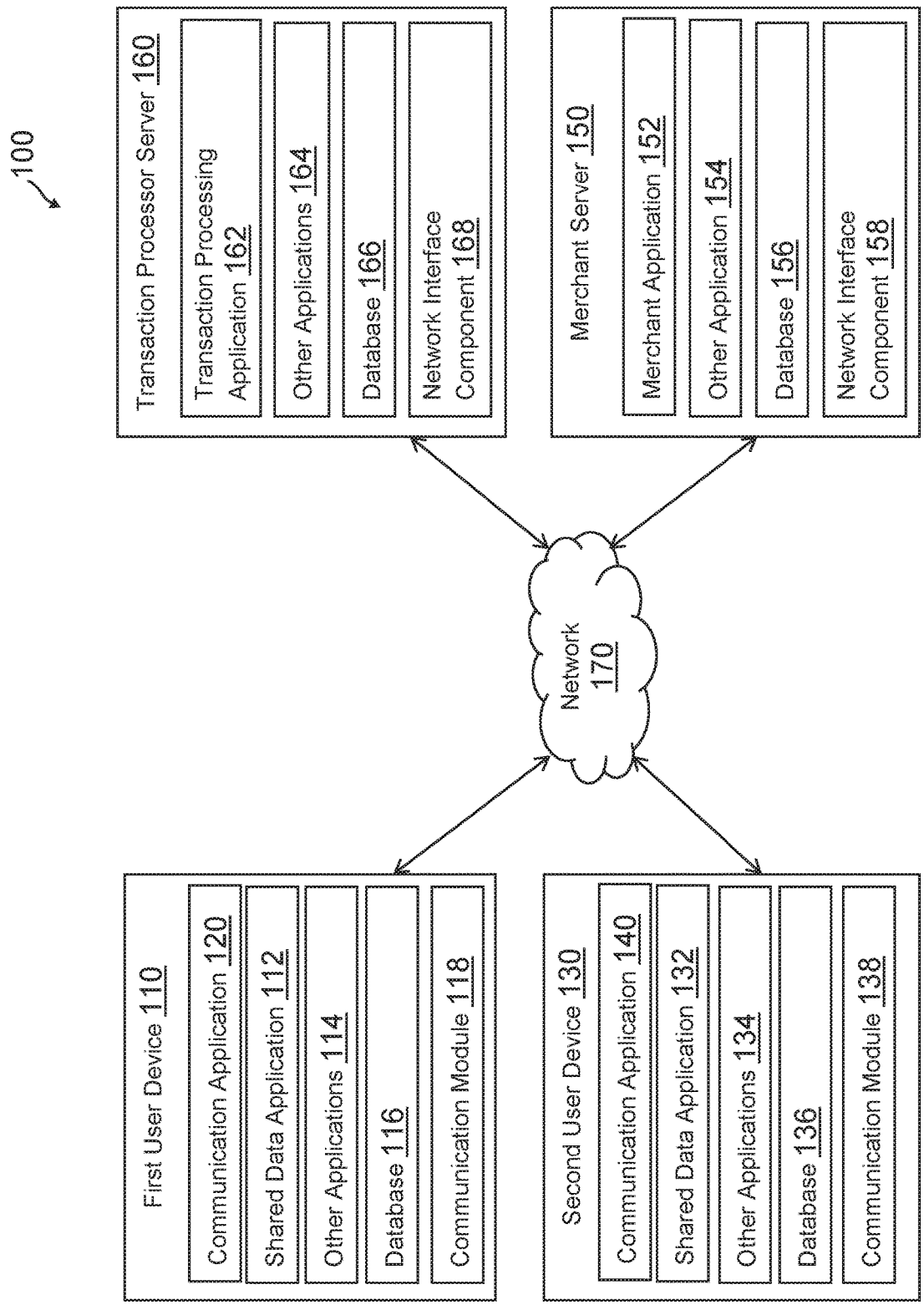
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for shared application interface data through a device-to-device communication session. Systems suitable for practicing methods of the present disclosure are also provided.

Users may exchange communication data through an established communication session between two devices, such as a voice or video chat session using a publically switched telephone network, a Voice over IP or Voice over LTE session, a networked data exchange for a digital audio/video stream (e.g., Google Hangouts®, Skype®, Facebook® Video Chat, or Face Time®), or other form of communication session. The users may also operate their devices to converse with other users through messaging sessions, such as SMS/MMS messaging, instant messaging, and social networking platform-based messaging. During the communication session, each user may utilize their device for separate data processing, for example, by accessing another application and processing data. The separate application may allow the users to view and interact with online data, including accessing websites and/or retrieving and processing online resource data through dedicated applications for service provides and merchants. Utilizing a plug-in or add-on to the application providing the communication session, a first user may request that application data from the separate application on the first user's device be shared with at least a second user's device during the communication session.

The first user's device may proceed to determine current application processing data, such as present data being output and displayed by the application in an application interface (e.g., a displayed webpage or an online marketplace having a displayed shopping session). The first user's device may determine application data necessary to display an instance of the current application output on the second user's device, and may transmit the data to the second user's device during the communication session, for example, using the data connection with the second user's device. The application data may correspond to the same application output instance, or may be changed based on user sharing preferences. The plug-in for the communication session may allow each user to view the application data, as well as make changes to the application data that may be conveyed to the other user's devices. For example, the second user may change a website option, which may be reflected on the first user's device. However, in other embodiments, each user may separately manipulate the application data without affecting the other devices. Additionally, where the application data corresponds to a shared shopping session, the users may engage in transaction processing during the communication session, as well as shared transaction processing. During shared transaction processing, the first user may request that the second user provide a portion of the transaction cost during the communication session. The plug-in may be utilized to request an amount, which may be provided by an account of the second user or from other data available to the second user's device. The first user may also request additional parties be added to the shared transaction outside of the communication session, where separate messages may be sent to such parties through the plug-in and/or separate application.

Thus, users may utilize various types of communication applications to converse with other users. For example, a first user may utilize their device to execute a communication application, which may establish a communication session with at least one other device of one or more other users. The communication session may be a live voice, video, and/or messaging session, or may be a delayed session where users may not all be present in the communication session at the same time. Users may also utilize online platforms, resources, and/or services to share information with other users. For example, a messaging or email service may provide instant messaging that allows two or more users to exchange messages instantaneously and engage in group messaging. A social networking platform (e.g., FACEBOOK®) may provide a user with an account where the user may transmit messages, engage in "hangouts" or group messaging, and post text and/or digital content (e.g., images, videos, emojis or other visual icons, etc.), which may include friends lists of contacts as well as posts and messages between users. In other embodiments, the users may utilize different types of online services to share information and/or perform messaging, including media sharing services (e.g., such as INSTAGRAM®), a microblogging service (e.g., for sharing of small text blog posts or direct messaging, such as TWITTER®), or other online service. The users may therefore post data or transmit messages using the online services, where the data may correspond to text, image, video, and/or other data (e.g., visual icons, such as emojis, animated images, etc.). Thus, the users may be linked to a communication session through shared exchange of electronic messages.

The communication application and/or first user's device includes an application, plug-in, or add-on to the communication application's functionalities, and allows for sharing of application data from another application resident on the first user's device. In further embodiments, the communication application may provide additional functionality to perform further application processes, such as web browsing, online data retrieval, and/or digital marketplace shopping sessions. While utilising the separate application (or the separate online data browsing processes within the communication application), the first user may view particular data, which may correspond to retrieved and/or processed application data that is viewable in a particular application interface. For example, the first user may view an item in an online marketplace, or visit a website where the first user may navigate through data and select particular data for visual output in a graphical user interface (GUI). Such data may correspond to an online shopping session within a digital merchant or marketplace, where the first user browse items for sale and purchase items in an electronic transaction.

The first user may further wish to share the current output data from the interface of the separate application/process with the second user's device during the communication session. For example, during a shopping session on a website or within another application, the first user may wish to show the second user an item, such as a dress or pair of shoes. Instead of sending a link to the particular item, the first user may execute a data sharing option on the first user's device that shares the same or a similar iteration or instance of the current output data in the selected interface with the second user's device during the communication session. The executable option may be provided by another application, or may be a plug-in or add-in provided by a service provider for the first and second users' devices. For example, the option may correspond to a selectable interface icon that causes execution of a device process to share current output data from a selected interface of an application. The option may be selected during the electronic communication session, and may allow the first user to select the application (e.g., the separate application) and/or the output data (e.g., the present interface display) that the first user wishes to share with the second user.

After selection of the option, the executable process/application associated with the option may determine the present application output data that the first user is viewing when the first user requests to share application data during the communication session. For example, the data sharing process may determine webpage data for a presently displayed webpage or application interface output data for a dedicated application of another merchant or service provider. The determined data may correspond to current output data (e.g., static and/or dynamic displayable data) as well as processing data occurring in the application during data display and output. The data may include generally accessed data, such as a webpage uniform resource locator (URL) or the uniform resource identifier (URI) for an online resource accessed by an application. The data may further include data input to a webpage or application interface and dynamic data processing by that corresponding application during display of the webpage. Once the current interface data is determined for the shared data, the shared data process may then determine application data required to display the same or a similar instance of the current interface data on the second user's device, for example, through the same or similar application on the second user's device.

When determining the application data, the shared data process may determine whether an instance of the output data for the second user's device (as well as additional users in the communication session) will be the same or whether the application data for the current output data shared with the second user's device may be altered or adjusted based on user preferences by the first and/or second users. A particular instance of application data may correspond to application data necessary to display data output requested by the first user on the second user's device. An instance may therefore correspond to a case or occurrence of application data output, such as a particular appearance, display, or other data of an element, content, document type, or a document. In this regard, application data for a particular instance of the current output data in the shared application/process of the first user's device may correspond to separate distinct application data that may be separately output in the first and second user's devices based on shared application data preferences and settings, as well as selected data for output. However, the basic structure of the data may remain the same (e.g., the general online navigation to the data, the application data structure, etc.). The first user may set preferences or settings that limit the amount of shared data, such as limiting the shared data to a particular URL while preventing sharing of data input to that webpage with the second user's device. For example, the application data may correspond to network data to display an item for purchase, but may not display a size, color, payment information, or other data that may be input by the first user to their device when viewing the item. The instance of the output data may also depend on location, such as available items deliverable or purchasable for each user's location and/or changes to application data based on geo-location. In the previous example of sharing a view of a dress or shoes on a website, the first user may not wish to share a color or size, but may generally wish to share an online link and view of the item. Thus, instances of an application's output may be correspond to the same data shared between the first user's device and the second user's device where the current output data is requested to be mirrored between the two devices, or may correspond to similar but different shared application data between the first and second user's devices based on particular settings and preferences.

After determination of the application data to display for a selected instance of the current output data on the second user's device, the first user's device may execute the shared data process to communicate the application data to the second user's device, which may then be displayed by the corresponding application on the second user's device. The data may be exchanged through the communication session, for example, using the same communication channel (e.g., the same encryption and/or data exchange protocols for the communication session), or may be transmitted through another data exchange process used by the data sharing process. Once the particular instance of the output data is displayed on the first and second user's devices, each user viewing their particular instance of the output data (e.g., the webpage or other online data that the first user is sharing, such as an item on a marketplace) may manipulate the data. The shared data process on each device may monitor changes to the output data, such as input to a webpage and/or changes of webpage options. Depending on preferences or requests, the changes may be pushed to other devices or each user may independently change the data. Additionally, each user may navigate to new webpages or online data, and independently view the data or request the data be shared with other devices during the communication session, as described above.

Additionally, during the communication session, one or more of the users may wish to purchase an item viewed in the separate application or process. This may include a shared transaction paid for by the requesting user and other users (e.g., where the first user requests co-payment, such as a loan or reimbursement, from one or more of the users on the communication session) or a group transaction for multiple purchases from two or more of the users in the communication session. The first user may view the item and wish to purchase the item, but be short an amount or realize that the second user owes the first user an amount of money. The first user may also wish to involve another user to provide at least a partial payment or a coupon/discount, such as a parent. The first user may enter an identifier of the parent or other entity to the communication session and/or data sharing process, and request that the additional entity be added to the shared data process, communication session, and/or transaction. The identifier may be used to send a message or request to a device of that entity, and the entity may be added to the process. The entity may then engage is data sharing as described above using their device through the communication session, and may provide an amount, benefit, or add additional items to the transaction, as described herein.

In other embodiments, as users separately browse items on an online marketplace and select items to add to a shopping cart and/or purchase, those users and their respective selected purchases may be rejoined for a group transaction. In order to process a transaction, a service provider, such as an entity utilising a transaction or payment processor, may provide a payment platform that enables a user to provide payments to a merchant, as well as engage in user-to-user (or peer-to-peer (P2P)) payments and transfers through electronic transaction processing using the payment platform. In this regard, the first and second users' devices may include a payment and/or transaction processing application, which may be configured to send and receive payments with other entities, such as another user and/or a merchant. The application may be associated with an electronic transaction processor, such as PayPal® or other online payment service, which may provide payments and other services on behalf of users. The electronic transaction processor may provide payment accounts and digital wallet services that enable the accounts to send, store, and receive money, process financial instruments, and/or provide transaction histories. The electronic transaction processor may offer further services to users, such as account establishment and maintenance, and other financial and personal services. The electronic transaction processor may further provide the add-on or plug-in utilized by the users' devices to exchange of application data during a communication session. In this regard, the plug-in may further offer transaction processing services through the application providing the communication session and/or the second application having the shared application data.

The transaction processor may provide account services to the users, which may be used for the transaction processing. Once an account is created, the account may be accessed through a web browser from a website of the service provider and/or a dedicated application of the service provider, such as a mobile smart phone application. A token may be issued to the device of each user for their respective personal account, where the token may include data (which may be encrypted) allowing the service provider to identify the user and their account and authenticate the user. When performing electronic transaction processing during the communication session for shared application data, the shared data process and/or transaction processor's device application may automatically authenticate each user for use of their respective account based on identifiers used in the communication session and/or device tokens stored on each device. This authentication information may be shared with the other devices through the shared data process, which may allow each device to identify the account of the other users in the communication session and authenticate them for transaction processing in a split transaction that incorporates two or more of the users on the call or communication session.

As each user contributes to the group transaction, such as a portion of a purchase for one or more users or each users selected item(s) for purchase by that particular user, the transaction processor may authenticate the user automatically during the communication session using the device's payment application and/or shared data process. Once authenticated for use of their respective payment account, the users may wish to checkout for the transaction. At checkout, one of more of the users may wish to add an additional party that is not currently in the communication session to the transaction, such as a co-payer (e.g., a parent, relative, guardian, lendee of a previous amount, etc.). For example, the first user may now wish to add their parent or another relative to the transaction to request a partial or complete payment for the item and addition of a benefit to the transaction. A device identifier for that user may be entered, and the transaction may be populated on the additional user's device. The additional user may also be added to the communication session. In various embodiments, a tag of the additional user and/or item may be used to add the user to the transaction. A tag may correspond to a selection in text or image data, such as an identifier for the user and/or another user in the posted data, a group identifier for a group of users, a word or statement preceded by a hashtag or other symbol denoting a topic or group, and/or other data that may be user to identify other users and/or groups of users (referred to herein as a "tag" or "tags"). The tag may be used to determine a name, account identifier (e.g., username for the account), device identifier, or other identifier used to determine an identity of the additional user's device.

In order to provide processing of the split transaction, the service provider (e.g., the transaction processor) may identify the portions owed by each individual user in the transaction, whether it is for a portion of a purchase for an individual user of for one or more items in the group transaction for that user. The portion owed may be designated by each user prior to or at checkout through the separate application interface on each user's device, where the application interface may display an instance of the group transaction and allow user input to enter a portion the respective user will pay, items to purchase, and/or benefits added to the transaction. Each user may be previously authenticated for use of their account for transaction processing. Once a portion owed by each user is determined, each individual user may receive separate checkout data for transaction processing of the owed amount. In other embodiments, as each user selects items for purchase or wishes to contribute to another's purchase, the user may be requested to checkout and provide payment, and the amount provided by the user may be collected in a group fund to process the group transaction on final checkout by the last user(s) processing the transaction. Thus, a group fund may be held in escrow by the service provider for final checkout, where each user's payment is then applied to the transaction or refunded to each user if the transaction is abandoned or declined. Payment may be processed based on the previous authentication and the user's account. In certain embodiments, the service provider may push a notification or other data to each device of the other users sharing in the transaction and/or may process one or more payments and/or reimbursement transactions using the notification. The payment may be made from a payment account of the merchant, or may be provided as a reimbursement to one user's account that is used to process the transaction.

After completing transaction, transaction processing, shipping/pick-up information, and/or other completed transaction information may be displayed to each individual user depending on the user's contribution to the transaction. The shared data process may allow the users to continue browsing during the communication session, and may process further transactions, as described herein. On request by one or more users and/or at the end of the communication session, the data sharing tool and process may end data sharing, and may discontinue sharing data with other devices and/or providing a link between application data.

In this manner, devices may streamline and simplify data sharing during communication sessions by removing the need for user input to select and navigate other devices to particular online data. The device's applications and/or processes may utilize a communication session to automatically identify other users to share data with, and may generate particular data output that allows the same or similar instances of data to be shared between devices in a quick and easy manner. Moreover, service providers may remove the need for separate electronic transaction processes to share in group transactions and/or provide payments over a network, thereby decreasing the number of processed transactions and computing resources needed to perform such operations. This saves valuable network and server resources, as well as simplifies user input required to interact with other users and devices over a network during electronic communication sessions.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a first user device 110, a second user device 130, a merchant server 150, and a transaction processor server 160 in communication over a network 170. A first user (not shown) may utilize first user device 110 to access the various features available through first user device 110, which may include processes and/or applications that may be used to share data with second user device 130. The shared data may be shared between first user device 110 and second user device 130 during a communication session, which may include online shopping data on a website or digital marketplace provided by merchant server 150. After sharing application data between first user device 110 and second user device 130, first user device 110 and second user device 130 may process a transaction with merchant server 150 using transaction processor server 160.

First user device 110, second user device 130, merchant server 150, and transaction processor server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

First user device 110 may be implemented as a communication device that may utilize appropriate hardware and software configured for wired and/or wireless communication with second user device 130, merchant server 150, and/or transaction processor server 160. For example, in one embodiment, first user device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

First user device 110 of FIG. 1 contains a communication application 120, a shared data application 112, other applications 114, a database 116, and a communication module 118. Shared data application 112 and other applications 114 may correspond to executable processes, procedures, and/or applications with associated hardware. In other embodiments, first user device 110 may include additional or different modules having specialized hardware and/or software as required.

Communication application 120 may correspond to one or more processes to utilize components of first user device 110 to establish a communication session with at least one other device, such as second user device 130. Communication application 120 may be implemented with an application having a user interface that allows for establishment of data communications for the exchange of voice, video, text, image, and/or messaging data. In this regard, communication application 120 may correspond to an application that uses a publically switched telephone network, a Voice over IP or Voice over LTE session, a networked data exchange for a digital audio/video stream (e.g., Google Hangouts®, Skype®, Facebook® Video Chat, or Face Time®), or other data exchange processes for voice or video chat. Communication application 120 may allow users to converse with other users through text or instant messaging sessions, such as SMS/MMS messaging, instant messaging, and social networking platform-based messaging. Other types of online platforms accessible by communication application 120 may provide text, voice, and/or video chat, including multi-user video communication sessions (e.g., through Web-RTC or a dedicated video data exchange service). In other embodiments, communication application 120 allow messaging through media sharing services (e.g., such as INSTAGRAM®), a microblogging service (e.g., for sharing of small text blog posts or direct messaging, such as TWITTER®), or other online service.

Thus, communication application 120 may correspond to a web browser used to access the online service and engage in a communication session. Communication application 120 may also correspond to a dedicated application of a service provider that allows for establishment of a communication session and exchange of communication data. Additionally, communication application 120 may be used to exchange data with second user device 130 for another application, such as shared data application 112 that may provide an instance of current application output data to second user device 130 for display, interaction, and transaction processing. For example, communication application 120 may transmit the shared application data through the communication session or through another communication channel. In certain embodiments, communication application 120 may include a plug-in, add-on, or other data sharing process that may determine the data to be shared with second user device 130 (and/or other devices) and transmit the data through the established communication session or another communication channel. However, in other embodiments, shared data application 112 may provide the data sharing plug-in, add-on, or process for communication application 120.

Shared data application 112 may correspond to one or more processes to execute modules and associated devices of first user device 110 to receive a request to share current output data from shared data application 112 and/or another application of first user device 110, determine application data for an instance of the current output data, and transmit the application data to second user device 130 for processing and interaction. In this regard, after receiving the request, shared data application 112 may determine the present or current output data for the requested application data to be shared with second user device 130. The current output data may be a webpage or visual interface of an application that displays interface data, including viewing items for sale from a merchant on a merchant marketplace. For example, the user of first user device 110 may wish to show an item the user is browsing with second user device 130 during the communication session using communication application 120. Shared data application 112 may determine the current output data, such as the data that may correspond to data presently displayed in an application interface and well as application processing data. In order to determine the current output data, a navigation address to online data may be determined and/or current application processing data, code, and/or other information may be determined.

Shared data application 112 may determine a specific instance of the current output data for second user device 130, which may depend on application sharing preferences, such as the current user input and/or selections within input fields of a user interface. Once application data for the instance is determined, the application data may be sent to second user device 130 by shared data application 112. Shared data application 112 may monitor changes to the current output data, such as additional input and/or navigation to other interfaces and data, and may update second user device 130 with the data, which may cause second user device 130 to update the application data displaying the particular instance. In other embodiments, shared data application 112 may only transmit the updates on request by first user device 110 and/or second user device 130. Additionally, shared data application 112 may receive shared data back from second user device 130, and may cause output of the data in the respective application, such as a change to the current output data. For example, second user device 130 may select a color or navigate to a new item during a shopping session, which may cause shared data application 112 to output the received shared data in an application interface.

Shared data application 112 may further include electronic transaction processing operations to process a shared or split transaction by the first user associated with first user device 110 with a merchant, which may include additional payments provided for the transaction by the second user associated with second user device 130. Shared data application 112 may be utilized by the user of first user device 110 to provide an interface to permit the user associated with first user device 110 to select payment options and provide payment for items, for example, to a merchant through merchant server 150 using transaction processor server 160. Shared data application 112 may be implemented with a user interface enabling the user to enter payment options, select and provide payment options on checkout/payment of one or more items with a merchant, and complete a split transaction for the item(s) through processing a payment request for the item(s) with transaction processor server 160. Shared data application 112 may also be used to establish a user account, such as a payment account, with transaction processor server 160 to provide payments through the payment account. Shared data application 112 may be used to enter transaction data, including an amount, location, and/or merchant identifier. The amount may be for less than the entire transaction, such as a portion of another user's purchase and/or an amount for purchase of selected items for the first user in a group transaction. Shared data application 112 may be used to request a payment from another user in the shared transactions, for example, a payment from second user device 130 and/or receive transaction processing results from a payment by shared data application 112. Shared data application 112 may further be utilized to message other users outside of the communication session to add the users to the transaction and/or communication session.

In various embodiments, first user device 110 includes other applications 114 as may be desired in particular embodiments to provide features to first user device 110. For example, other applications 114 may include security applications for implementing client-side security features, programmatic client applications for interfacing with appropriate application programming interfaces (APIs) over network 170, or other types of applications. Other application 114 may also correspond to applications that shared data application 112 utilizes when determining application data for an instance of current application data output that is transmitted to second user device 130. However, in other embodiments, shared data application 112 may include current application data output that is shared with second user device 130.

Other applications 114 may include browser applications configured to access website data over the Internet, display webpages, and interact with online data, for example, by shopping for items on a digital marketplace. Other applications 114 may include dedicated merchant applications utilized to access an online marketplace and browse items for sale. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for first user device 110. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use devices of first user device 110, such as display devices capable of displaying information to users and other output devices.

First user device 110 may further include database 116 stored in a transitory and/or non-transitory memory of first user device 110, which may store various applications and data and be utilized during execution of various modules of first user device 110. Database 116 may include, for example, identifiers such as operating system registry entries, cookies associated with shared data application 112 and/or other applications 114, identifiers associated with hardware of first user device 110, or other appropriate identifiers, such as identifiers used for payment/user/device authentication or identification, which may be communicated as identifying first user device 110 to transaction processor server 160. Application data that is shared with one or more other devices may be stored in database 116 after determination by shared data application 112. Database 116 may include transaction information for one or more split transactions.

First user device 110 includes at least one communication module 118 adapted to communicate with second user device 130, merchant server 150, and/or transaction processor server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Second user device 130 may be implemented as a communication device that may utilize appropriate hardware and software configured for wired and/or wireless communication with first user device 110, merchant server 150, and/or transaction processor server 160. For example, in one embodiment, second user device 130 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Second user device 130 of FIG. 1 contains a communication application 140, a shared data application 132, other applications 134, a database 136, and a communication module 138. Shared data application 132 and other applications 134 may correspond to executable processes, procedures, and/or applications with associated hardware. In other embodiments, second user device 130 may include additional or different modules having specialized hardware and/or software as required.

Communication application 140 may correspond to one or more processes to utilize components of second user device 130 to participate in a communication session with at least one other device, such as first user device 110, which may include establishment of the communication session. Communication application 140 may be implemented with an application having a user interface that allows for data communications for the exchange of voice, video, and/or messaging data. In this regard, communication application 140 may correspond to an application that uses a publically switched telephone network, a Voice over IP or Voice over LTE session, a networked data exchange for a digital audio/video stream (e.g., Google Hangouts®, Skype®, Facebook® Video Chat, or Face Time®), or other data exchange processes for voice or video chat. Communication application 140 may allow users to converse with other users through text or instant messaging sessions, such as SMS/MMS messaging, instant messaging, and social networking platform-based messaging. Other types of online platforms accessible by communication application 140 may provide text, voice, and/or video chat, including multi-user video communication sessions (e.g., through Web-RTC or a dedicated video data exchange service). In other embodiments, communication application 140 allow messaging through media sharing services (e.g., such as INSTAGRAM®), a microblogging service (e.g., for sharing of small text blog posts or direct messaging, such as TWITTER®), or other online service.

Thus, communication application 140 may correspond to a web browser used to access the online service and engage in a communication session. Communication application 140 may also correspond to a dedicated application of a service provider that provides a communication session and exchange of communication data. Additionally, communication application 140 may be used to exchange data with first user device 110 for another application, such as shared data application 132 that may receive an instance of current application output data from first user device 110 for display, interaction, and transaction processing by a second user associated with second user device 130. For example, communication application 140 may receive the shared application data through the communication session or through another communication channel. In certain embodiments, communication application 140 may include a plug-in, add-on, or other data sharing process that may receive the application data from first user device 110 (and/or other devices) through the established communication session or another communication channel, and may respond with additional data based on changes and navigations by the second user in the application. However, in other embodiments, shared data application 132 may provide the data sharing plug-in, add-on, or process for communication application 140.

Shared data application 132 may correspond to one or more processes to execute modules and associated devices of second user device 130 to receive application data for an instance of current output data from first user device 110, output the data using the application on second user device 130, and transmit interactions to and/or navigations from the application data by the second user associated with second user device 130 to first user device 110 on request by the second user. In this regard, after receiving the application data, shared data application 132 may determine the application associated with the application data and process the application data using the application, including outputting an interface that includes the instance of the current output data on first user device 110 in the application. The current output data may be a webpage or visual interface of an application that displays interface data, including viewing items for sale from a merchant on a merchant marketplace. For example, second user device 130 may output data for an item on a virtual marketplace that may be displayed to the second user so that the second user may view the item, change item parameters or preferences, and purchase the item or provide a payment for the item. Shared data application 132 may monitor changes to the application data, such as additional input and/or navigation to other interfaces and data, and may update first user device 110 with the data, which may cause first user device 110 to display the changes. Shared data application 132 may determine changes to the output data, such as the data that may correspond to data presently displayed in an application interface after user input and interaction. Shared data application may then transmit the changes to first user device 110 for display automatically or based on a request by the second user. For example, first user device 110 may select a color or navigate to a new item after viewing the item displayed in the application data received from first user device 110, which may cause shared data application 132 to transmit the changes to first user device 110.

Shared data application 132 may further include electronic transaction processing operations to process a shared or split transaction by the second user associated with second user device 130 with a merchant, which may include additional payments provided for the transaction by the first user associated with first user device 110. Shared data application 132 may be utilized by the user of second user device 130 to provide an interface to permit the user associated with second user device 130 to select payment options and provide payment for items, for example, to a merchant through merchant server 150 using transaction processor server 160. Shared data application 132 may be implemented with a user interface enabling the user to enter payment options, select and provide payment options on checkout/payment of one or more items with a merchant, and complete a split transaction for the item(s) through processing a payment request for the item(s) with transaction processor server 160. Shared data application 132 may also be used to establish a user account, such as a payment account, with transaction processor server 160 to provide payments through the payment account. Shared data application 132 may be used to enter transaction data, including an amount, location, and/or merchant identifier. The amount may be for less than the entire transaction, such as a portion of another user's purchase and/or an amount for purchase of selected items for the first user in a group transaction. Shared data application 132 may be used to request a payment from another user in the shared transactions and/or provide a payment for all or a portion of a transaction, for example, a payment for part of a transaction on behalf of the first user for first user device 110. Shared data application 132 may also display transaction processing results from a payment by shared data application 132.

In various embodiments, second user device 130 includes other applications 134 as may be desired in particular embodiments to provide features to second user device 130. For example, other applications 134 may include security applications for implementing client-side security features, programmatic client applications for interfacing with appropriate application programming interfaces (APIs) over network 170, or other types of applications. Other application 114 may also correspond to applications that shared data application 132 utilizes when outputting application data for an instance of current application data output that is receive from first user device 110. However, in other embodiments, shared data application 132 may include current application data output that is shared with first user device 110.

Other applications 134 may include browser applications configured to access website data over the Internet, display webpages, and interact with online data, for example, by shopping for items on a digital marketplace. Other applications 134 may include dedicated merchant applications utilized to access an online marketplace and browse items for sale. In various embodiments, other applications 134 may include financial applications, such as banking applications. Other applications 134 may also include other location detection applications, which may be used to determine a location for the user, such as a mapping, compass, and/or GPS application, which can include a specialized GPS receiver that obtains location information for second user device 130. Other applications 134 may include device interfaces and other display modules that may receive input from the user and/or output information to the user. For example, other applications 134 may contain software programs, executable by a processor, including a graphical user interface (GUI) configured to provide an interface to the user. Other applications 134 may therefore use devices of second user device 130, such as display devices capable of displaying information to users and other output devices.

Second user device 130 may further include database 136 stored in a transitory and/or non-transitory memory of second user device 130, which may store various applications and data and be utilized during execution of various modules of second user device 130. Database 136 may include, for example, identifiers such as operating system registry entries, cookie s associated with shared data application 132 and/or other applications 134, identifiers associated with hardware of second user device 130, or other appropriate identifiers, such as identifiers used for payment/user/device authentication or identification, which may be communicated as identifying second user device 130 to transaction processor server 160. Application data that is received from and/or shared with one or more other devices may be stored in database 136. Database 136 may include transaction information for one or more split transactions.

Second user device 130 includes at least one communication module 138 adapted to communicate with first user device 110, merchant server 150, and/or transaction processor server 160. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 138 may communicate directly with nearby devices using short range communications, such as Bluetooth Low Energy, LTE Direct, WiFi, radio frequency, infrared, Bluetooth, and near field communications.

Merchant server 150 may be maintained, for example, by a merchant that provides sales to users through first user device 110, second user device 130, and/or transaction processor server 160, which may include sale of items for more than one user in a shared transaction between the users. Merchant server 150 may provide item data over network 170 for an online marketplace, where the item data may be shared between first user device 110 and second user device 130 during a communication session. In this regard, merchant server 150 may correspond to a device having processing applications, which may be configured to interact with first user device 110 and second user device 130 to engage in a shared transaction. Merchant server 150 may further interface with transaction processor server 160 for transaction processing of the transactions. Merchant server 150 may be implemented using any appropriate hardware and software configured for wired and/or wireless communication with first user device 110 and/or second user device 130. For example, in one embodiment, merchant server 150 may be implemented as a single or networked personal computer (PC), a smart phone, laptop computer, wearable computing device, and/or other types of computing devices at a merchant location capable of transmitting and/or receiving data. Although only one merchant device is shown, a plurality of merchant devices may function similarly.

Merchant server 150 of FIG. 1 contains a merchant application 152, other applications 154, a database 156, and a network interface component 158. Merchant application 152 and other applications 154 may correspond to processes, procedures, and/or applications executable by a hardware processor, for example, a software program. In other embodiments, merchant server 150 may include additional or different modules having specialized hardware and/or software as required.

Merchant application 152 may correspond to one or more processes to execute modules and associated specialized hardware of merchant server 150 that provide online item data (e.g., accessible online data for items that may be displayed through a webpage or other online marketplace), as well as checkout and payment processes for a transaction to purchase one or more items for sale from a merchant or seller corresponding to merchant server 150. In this regard, merchant application 152 may correspond to specialized hardware and/or software of merchant server 150 to provide a convenient interface to permit a seller to enter, view, and/or edit items and/or services available for purchase in a transaction, which may include a transaction for multiple users that is paid for in a single electronic transaction processing event. For example, merchant application 152 may be implemented as an application having a user interface enabling the seller to enter item information and request payment for a transaction on checkout/payment of one or more items/services. In certain embodiments, merchant application 152 may correspond more generally to a web browser configured to provide information over the Internet, for example, by hosting a website or online marketplace corresponding to the merchant and/or communicating information to another online marketplace utilized by the merchant or seller.

Thus, merchant application 152 may provide item sales through an online marketplace using the website of the merchant or another service provider. The users associated with first user device 110 and second user device 130 may initiate a shared transaction using merchant application 152, where transaction processing may occur through communications between first user device 110 and second user device 130. Item sales and/or transaction information may be communicated to first user device 110, where the user associated with first user device 110 may view and interact with the information, as well as share the information with second user device 130 during a communication session between the devices. In other embodiments, second user device 130 may navigate to the online data provided by merchant application 152 and may share the data with first user device 110.

Once a payment amount is determined for a shared transaction for items to be purchased by users, such as the first user associated with first user device 110 and the second user associated with second user device 130, merchant application 152 may request payment for transaction processing. Payment may be provided through a payment instrument. Merchant application 152 may receive requests for use of additional sales incentives and available payment processes, such as a payment plan, extendable credit, or other incentive (e.g., rebates, discounts, etc.). Payment information may be communicated to merchant server 150, which may be used with the transaction and transaction information for approval. Merchant application 152 may then receive the results of the transaction processing, and complete the transaction with the user, for example, by providing the first, second, and/or other users with the items for the split transaction or declining the split transaction where the users are not authenticated or the split transaction is not authorized (e.g., insufficient funds, rejection of the transaction based on risk analysis, etc.). Merchant application 152 may receive a payment notification from transaction processor server 160, including the payment value. A transaction history or receipt may then be generated by merchant application 152 and provided to one or more of first user device 110, second user device 130, and/or transaction processor server 160.

Merchant server 150 includes other applications 154 as may be desired in particular embodiments to provide features to merchant server 150. For example, other applications 154 may include security applications for implementing client-side security features, programmatic client applications for interfacing with appropriate application programming interfaces (APIs) over network 170, or other types of applications. Other applications 154 may also include email, texting, voice and IM applications that allow a user to send and receive emails, calls, texts, and other notifications through network 170. In various embodiments, other applications 154 may include financial applications, such as banking, online payments, money transfer, or other applications. Other applications 154 may contain software programs, executable by a processor, including a graphical user interface (GUI) configured to provide an interface to the user.

Merchant server 150 may further include database 156 which may include, for example, identifiers such as operating system registry entries, cookies associated with merchant application 152 and/or other applications 154, identifiers associated with hardware of merchant server 150, or other appropriate identifiers, such as identifiers used for payment/user/device authentication or identification. Identifiers in database 156 may be used by a payment/credit provider to associate merchant server 150 with a particular account maintained by the payment/credit provider. Database 156 may further include transaction information and/or results, including received payment information.

Merchant server 150 includes at least one network interface component 158 adapted to communicate with first user device 110, second user device 130, and/or transaction processor server 160. In various embodiments, network interface component 158 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor server 160 may be maintained, for example, by an online service provider, which may provide transaction processing services, as well as additional transaction and payment services, to one or more users. In this regard, transaction processor server 160 includes one or more processing applications which may be configured to interact with first user device 110, second user device 130, merchant server 150, and/or another device/server to facilitate connecting users having a shared interest. In one example, transaction processor server 160 may be provided by PAYPAL®, Inc. of San Jose, Calif., USA. However, in other embodiments, transaction processor server 160 may be maintained by or include another type of service provider, which may provide the aforementioned services to a plurality of users.

Transaction processor server 160 of FIG. 1 includes a transaction processing application 162, other applications 154, a database 156, and a network interface component 158. Transaction processing application 162 and other applications 154 may correspond to executable processes, procedures, and/or applications with associated hardware. In other embodiments, transaction processor server 160 may include additional or different modules having specialized hardware and/or software as required.

Transaction processing application 162 may correspond to one or more processes to execute software modules and associated specialized hardware of transaction processor server 160 to receive a shared transaction between first user device 110 and second user device 130 for a purchase of one or more items from merchant server 150, which may include processing different amounts for the transaction from each user. In this regard, transaction processing application 162 may correspond to specialized hardware and/or software to receive information for a shared transaction and determine an amount owed by each user. For example, transaction processing application 162 may receive, from first user device 110, second user device 130 and/or merchant server 150, data for a shared transaction having the first user associated with first user device 110 and other additional users, such as the second user associated with second user device 130, as transaction participants in purchasing items from the merchant associated with merchant server 150. The data for the shared transaction may include transaction information, such as a cost of the transaction, items in the transaction, tax, tip, and/or other transaction information. In various embodiments, the users and/or the merchant may include user information for the user and/or the other users that allows identification of the user and/or the other users. However, in other embodiments, transaction processing application 162 may determine the transaction is a shared transaction based on the communication session between first user device 110, second user device 130, and/or other users.

After receiving the transaction information and the users in the transaction, transaction processing application 162 may determine an amount to be contributed by each user, for example, based on user selections of items for purchase and/or designations of an amount or percentage to be paid by each user. Transaction processing application 162 may also determine past transactions, loans, or amounts transferred between users, and may determine if one user owes the other user a reimbursement. For example, the first user may pay for a transaction for the second user, which may be designated in a transaction history for the first and/or second user. Thus, transaction processing application 162 may determine that the second user owes the first user a reimbursement, and may provide an option for the second user to reimburse the first user during the communication session having electronic shopping shared data. Transaction processing application 162 may further process any benefits, such as coupons or discounts, provided by one or more of the users, which may affect the transaction total and the amount owed by a user. After determining the amount owed by each user and the transaction total, transaction processing application 162 may determine a payment instrument for each user, which may correspond to entered payment data or an account that has previously been authenticated for use. For example, transaction processing application 162 may receive identifiers and/or payment tokens associated with first user device 110 and second user device 130 during the communication session between the devices, and may authenticate each device for use of an account with transaction processor server 160. Transaction processing application 162 may then either process a single transaction using multiple payment instrument and/or accounts in a single electronic processing operation, or may process each individual account/payment instrument for the amount owed by each instrument.

Thus, transaction processing application 162 may provide transaction processing services to users, for example though a payment account and/or payment instruments, which may include payment during transaction processing of a split transaction. In this regard, transaction processing application 162 may provide payment services and payment accounts, including digital wallets storing payment instruments. The transaction processing services may allow for a payment by users associated with first user device 110 and/or second user device 130 to a merchant for a shared transaction through one or more payment instruments, including a credit/debit card, banking account, payment account with transaction processor server 160, and/or other financial instrument. In order to establish a payment account for a user to send and receive payments, transaction processing application 162 may receive information requesting establishment of the payment account. The information may include user personal and/or financial information. Additionally, the information may include a login, account name, password, PIN, or other account creation information. The user may provide a name, address, social security number, or other personal information necessary to establish the account and/or effectuate payments through the account. Transaction processing application 162 may further allow the user to service and maintain the payment account, for example, by adding and removing payment instruments. Transaction processing application 162 may be used to process a transaction between one or more users paying for the transaction and a merchant, as well as payments and transfers between users. In order to perform transaction processing of the transaction and/or payments, transaction processing application 162 may debit an account of the user and provide the payment to an account of the merchant or other. Transaction processing application 162 may also be used to provide transaction histories for processed transactions.

In various embodiments, transaction processor server 160 includes other applications 154 as may be desired in particular embodiments to provide features to transaction processor server 160. For example, other applications 154 may include security applications for implementing server-side security features, programmatic client applications for interfacing with appropriate application programming interfaces (APIs) over network 170, or other types of applications. Other applications 154 may contain software programs, executable by a processor, including a graphical user interface (GUI), configured to provide an interface to the user when accessing transaction processor server 160, where the user or other users may interact with the GUI to more easily view and communicate information. In various embodiments, other applications 154 may include connection and/or communication applications, which may be utilized to communicate information to over network 170.

Additionally, transaction processor server 160 includes database 156. As previously discussed, a user may establish one or more digital wallets and/or payment accounts with transaction processor server 160. Digital wallets and/or payment accounts in database 156 may include user information, such as name, address, birth date, payment instruments/funding sources, additional user financial information, user preferences, and/or other desired user data. Users may link to their respective digital wallets and/or payment accounts through an account, user, and/or device identifier. Thus, when an identifier is transmitted to transaction processor server 160, e.g., from first user device 110 and/or second user device 130, one or more digital wallets and/or payment accounts belonging to the users may be found. Database 156 may also store received transaction information for split transactions and/or shared data for a transaction during a communication session.

In various embodiments, transaction processor server 160 includes at least one network interface component 158 adapted to communicate first user device 110, second user device 130, and/or merchant server 150 over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
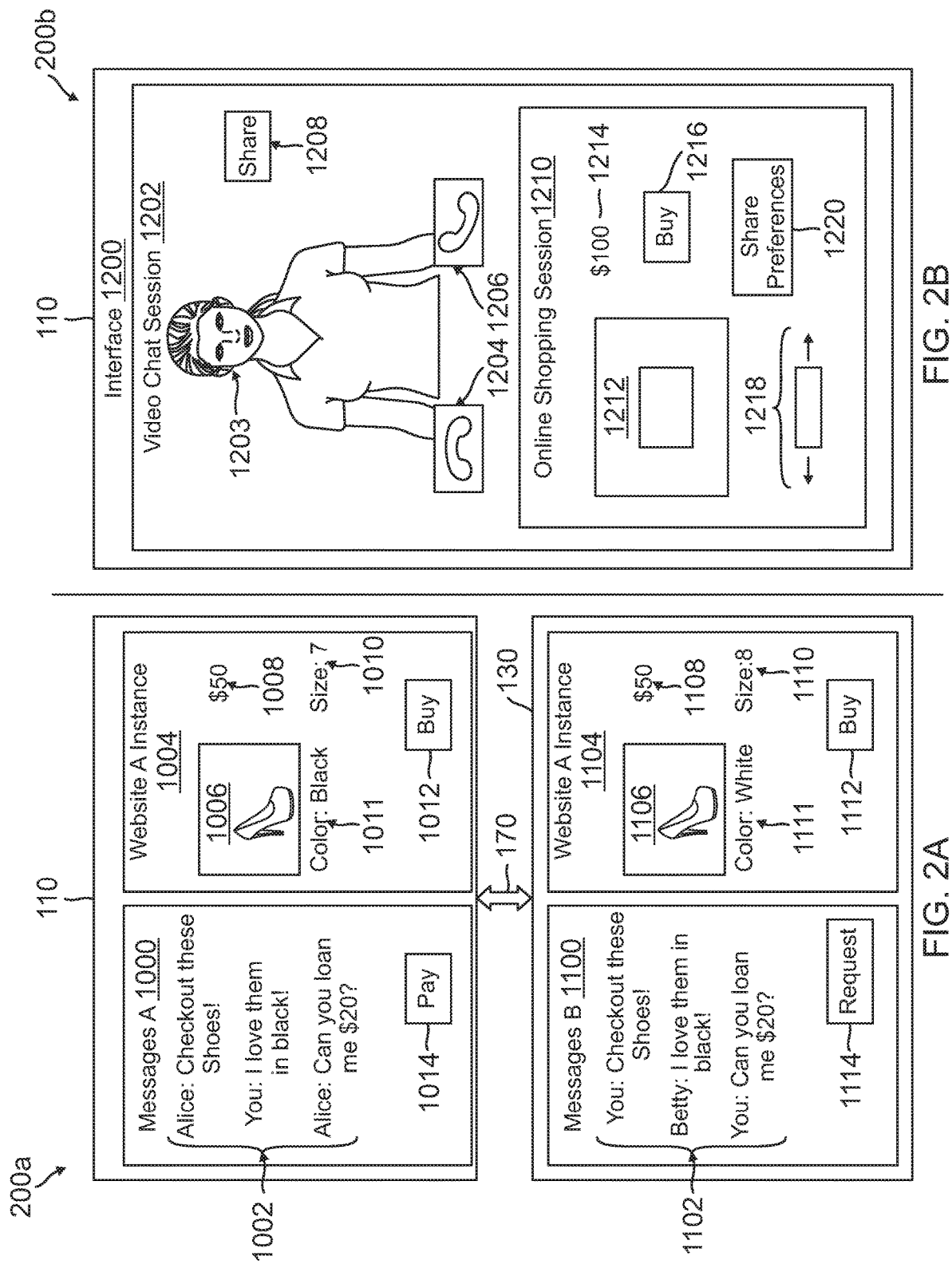
FIG. 2A is an exemplary system environment having two devices displaying shared application data during a communication session, according to an embodiment.
FIG. 2B is an exemplary application interface of a device during a video communication session after receiving shared application data according to an embodiment.

FIG. 2A is an exemplary system environment having two devices displaying shared application data during a communication session, according to an embodiment. Environment 200a includes first user device 110 in communication with second user device 130 over network 170, discussed in reference to system 100 of FIG. 1, for the purpose of sharing application data during a communication session. In this regard, first user device 110 and second user device 130 may execute one or more communication and data sharing processes discussed in reference to system 100 of FIG. 1.

First user device 110 includes one or more interfaces that display Messages A 1000 and website A instance 1004. Messages A 1000 may correspond to messages exchanged during a communication session, which may further include voice, text, or video data exchange not shown in environment 200a. In this regard, messages 1002 show a conversation between "Alice" and "Betty" on Betty's device, first user device 110. During messages 1002, Alice requests that Betty view an item for sale on a website by messaging "Check out these shoes!" Alice may then use Alice's device, second user device 130, to share data with first user device 110. This may be initialized through a data sharing process of a communication/messaging application and/or a shopping application that utilizes identifiers and data exchanged through the communication session corresponding to messages A 1000 and messages B 1100 to perform an endpoint-to-endpoint data transfer of application data. Second user device 130 includes messages B 1100 and website A instance 1104 displayed in application interfaces of second user device 130. Messages 1102 display Alice's request, which may also be input to second user device 130 so that second user device 130 shares the same or similar instance of website A with first user device 110.

Website A instance 1104 on second user device 130 displays item 1106, the shoes Alice wishes to share with Betty for viewing. Website A instance 1104 further includes an amount 1108 for item 1106, a size 1110 of 8, a color 1111 of white, and a purchase option 1112. When application data for website A instance 1104 is transmitted to first user device 110 over network 170, the application data may not include all of the same data, for example, by removing input for size 1110 and color 1111 that may not apply to Betty and/or may be hidden in preferences set by Alice. Thus, website A instance 1004 on first user device 110 shows the same item 1006 in a browser interface displaying website A, as well as the amount 1008 and purchase option 1012 that may be similarly utilized by Betty. However, size 1010 is selected as 7 and color 1011 displays black for website A instance 1004 on first user device 110 corresponding to separate input from Betty to first user device 110. In other embodiments, the system knows preferences of Betty, such as through purchases or searches made by or for Betty or preferences set by Betty, and displays item 1106 for Betty with her preferences, e.g., size and color. As a result, Betty does not need to enter her specific preferences for item 1106.

For example, second user device 130 and/or an online data sharing processor may determine application data for website A instance 1104 that can be shared with first user device 110 to cause display of website A instance 1004. This may correspond to the webpage data for a presently displayed webpage in website A instance 1104, which may be retrieved from the corresponding website and/or based on a browser application displaying website A instance 1104. Browser data for second user device 130 may include a webpage uniform resource locator (URL) or the uniform resource identifier (URI), as well as current input and processes for the website A instance 1104. Thus, the determined data may correspond to current output data (e.g., static and/or dynamic displayable data) as well as processing data occurring in the application during data display and output. The shared data process may determine data sharing preferences for website A instance 1104 set by Alice based both on designated preferences/settings and changes to interface data displayed within website A instance 1004 and website A instance 1104.

When determining the application data to provide to first user device 110 for website A instance 1004, the shared data process on second user device 110 may determine whether an instance of the output data for first user device 110 will be the same or whether the application data for website A instance 1104 shared with first user device 110 may be altered or adjusted based on user preferences, past data sharing events, and/or browsing history. In this regard, application data for website A instance 1104 may correspond to a separate distinct instance of application data for website A instance 1004 based on preferences and past data for first user device 110 and second user device 130, but may include generally the same navigation or online data, such as the same webpage without user input or selections of webpage options. Second user device 130 may include preferences or settings that limit the amount of shared data, such as limiting the shared data to a particular URL while preventing sharing of data input to that webpage. Thus, size 1010 and color 1011 and different from size 1110 and color 1111. Selection of whether to share size 1110 and color 1111 with first user device 110 when transmitting application data may also be based on what second user device 130 may previously have shared (e.g., has not shared website options or previously does share website options and user input). This may also be based on a geo-location of first user device 110 and whether the particular options or items are available for size 1110 and color 1111. Additionally, a previous browsing history for first user device 110 may be used to automatically populate size 1010 and color 1011 on first user device 110 with the received application data from second user device 130 depending on the sizes and colors previously used by Betty when shopping on first user device 110. Thus, each user may separately browse and interact with the shared data for website A but still receive similar information necessary to navigate to item 1006 on website A.

During messages 1002 and messages 1102, Alice requests that Betty loan her $20 for the amount 1108 displayed in website A instance 1104 to complete purchase option 1112 on second user device 130. Alice may utilize the communication session in messages B 1100 on second user device 130 to transmit a request 1114 for $20 from Betty through first user device 110. Alice and Betty may be pre-authenticated for use of their online accounts for transfers and/or payments based on identifiers and/or tokens stored on first user device 110 and second user device 130, as well as based on the use of the shared data process that allows sharing of shopping data and authentication of user account use for transaction processing. Betty may receive request 1114 on first user device 110, and may utilize a group payment process 1014 to provide the $20 to Alice's purchase of item 1106 on website A. Thus, during checkout by Alice using second user device 130, the $20 may be applied to the transaction from Betty's account.

Shared or group transactions between Alice and Betty may be processed through data exchanges and/or additional user accounts and benefits. For example, a shared or group transaction paid for by Alice using purchase option 1112 directly. This may occur by Alice providing the funds to purchase item 1106 using an account. In order to process the transaction using Alice's account, Alice may previously log in to the account and/or be authenticated for account usage in the transaction processing operation or application associated with purchase option 1112. Additionally, so that split and group transactions may be processed by first user device 110 and second user device 130 during a communication session, the shared data process and/or transaction processor's application that provides the shared data process for website A instance 1004 and website A instance 1104 may automatically authenticate Alice and Betty for use of their respective account based on identifiers used in their communication session and/or device tokens stored on first user device 110 and second user device 130. This authentication and/or identifier/token may be shared between first user device 110 and second user device 130 securely through the shared data process and the communication session, which may allow each device to identify the account of the other users in the communication session and authenticate them for transaction processing in a group or split transaction. Thus, first user device 110 and second user device 130 may be automatically authenticated with an online electronic transaction processor to complete purchase options 1012/1112 and/or for Betty to process the $20 loan in group payment process 1014.

The previously loaned $20 from Betty may be deposited in Alice's account directly after Betty selects group payment process 1014 and provides funds from Betty's account. In other embodiments, as Alice and Betty contribute to the group transaction, such as a portion of a purchase for one or more users or each users selected item(s) for purchase by that particular user, the online transaction processor may utilize the automatic authentication of each user to add funds to a group pool, which may be held in a virtual account until processing and completion of the group transaction. Alice may also utilize first user device 110 to enter an identifier of another user Alice wishes to add to messages B 1100, purchase option 1112, and/or group payment process 1014, and request that the additional user be added so that additional funds may be provided for group payment process 1014. The identifier may be used to send a message or request to a device of that user, and the user may be added to the corresponding process. The user's device may be authenticated for use of an account for group payment process 1014, and may provide funds to Alice in a similar manner as Betty did.

As previously discussed, Alice may process a transaction directly using purchase option 1112. Additionally, group payment process 1014 may provide a group payment for a shared or split transaction between both Alice and Betty. The online transaction processor may identify the portions owed by Alice and Betty, including items selected (e.g., item 1106 by Alice) and the loans or payments provided by other users (e.g., the $20 loan given to Alice based on request 1114). The portion owed may be designated by Alice and Betty prior to or at checkout through the separate application interface accessible through group payment process 1114, which may provide an interface for Alice and Betty to enter payment amounts and/or select payment accounts/instruments (which may include benefits). Since Alice and Betty are previously authenticated, first user device 110 and second user device 130 may receive separate checkout data for the portion owed by that respective user. Processing of the checkout data may allow the transaction processor to add the funds to the group transaction directly.

In various embodiments, a transaction may not be directly processed, and the online transaction processor may utilize a digital debit/earmark and a virtual account to store the funds from Alice's and Betty's account until completion of group payment process 1014. Thus, a group fund may be held in escrow by the service provider for final checkout, and may be refunded or unmarked if the transaction is abandoned. Once funds are added to a group pool (e.g., held in a virtual account or escrow by the transaction processor), the online transaction processor may process an electronic transaction using the funds through purchase option 1012/1112 and/or group payment process 1014. Payment may be processed based on the previous authentication of Alice and Betty through the communication session for messages A 1000 and messages B 1100.

FIG. 2B is an exemplary application interface of a device during a video communication session after receiving shared application data according to an embodiment. Environment 200b includes a first user device 110 discussed in reference to system 100 of FIG. 1. In this regard, first user device 110 is shown with an interface 1200 that displays a video chat session 1202 with a second user 1203 during an online shopping session 1210, where application data may be shared and separately manipulated and processed by each individual device.

In environment 200b, interface 1200 displays second user 1203 during video chat session 1202, which may be initiated and ended using end function 1204 and call function 1206. Additional users may be added to video chat session 1202 using call function 1206. During video chat session 1202, the first user associated with first user device 110 may utilize another interface and/or application to perform online shopping session 1210, and may wish to share an item 1212 that the first user views during online shopping session 1210 with second user 1203 on second user 1203's device. Thus, a share option 1208 may be displayed in interface 1200, where share option 1208 corresponds to a plug-in, add-on, and/or application process that allows the first user to transmit application data corresponding to online shopping session 1210 with second user 1203.

Initialization of the process to share data may occur based on selection of the plug-in, where an identifier or contact address for the other device associated with second user 1203 may be determined from the communications occurring during video chat session 1202. For example, a phone number, messenger name, online address, or unique identifier for second user 1203's device that may be used to establish a point-to-point data transfer channel may be determined through video chat session 1202. This may allow for a data transfer process of share option 1208 to transmit data to second user 1203's device. The shared data process provided through share option 1208 may be included with or added as an additional feature to a communication application corresponding to video chat session 1202, for example, as an application preference, add-on, or plug-in. This allows the shared data process to directly access application data and determine the data transfer identifier for second user 1203's device. However, in other embodiments, the data sharing process may be initialized through another application, including a browser or shopping application that is opened and provides online shopping session 1210.

When initialization of the process occurs through a separate application, the user may consent to interaction between the communication application for video chat session 1202 and the other application providing online shopping session 1210. This may allow for on-device data exchange through API calls and/or database look-ups that allows the separate application to determine an identifier used for data transfer of the shared data. The shared data may correspond to present output data of an application and/or online addresses for data retrieval by another device. For example, first user device 110 may determine navigation data to item 1212 with an online merchant platform, which may include price 1214 and/or purchase option 1216 also available for output when viewing item 1212. First user device 110 may also determine current input, such as a color or size selected by the user in an interface webpage interface, and transmit that data. Additionally, share preferences 1220 may be used to determine the specific application data transmitted to second user 1203's device. For example, share preferences 1220 may limit or change certain data displayed in online shopping session 1210, or may customize the data for second user 1203. After transmission of the application data to the other device, the first user may further user 1218 to navigate to other shopping or item data. The navigation and other accessed data may be automatically shared with the other device, or the first user may be required to again select share option 1208.

Figure 3:
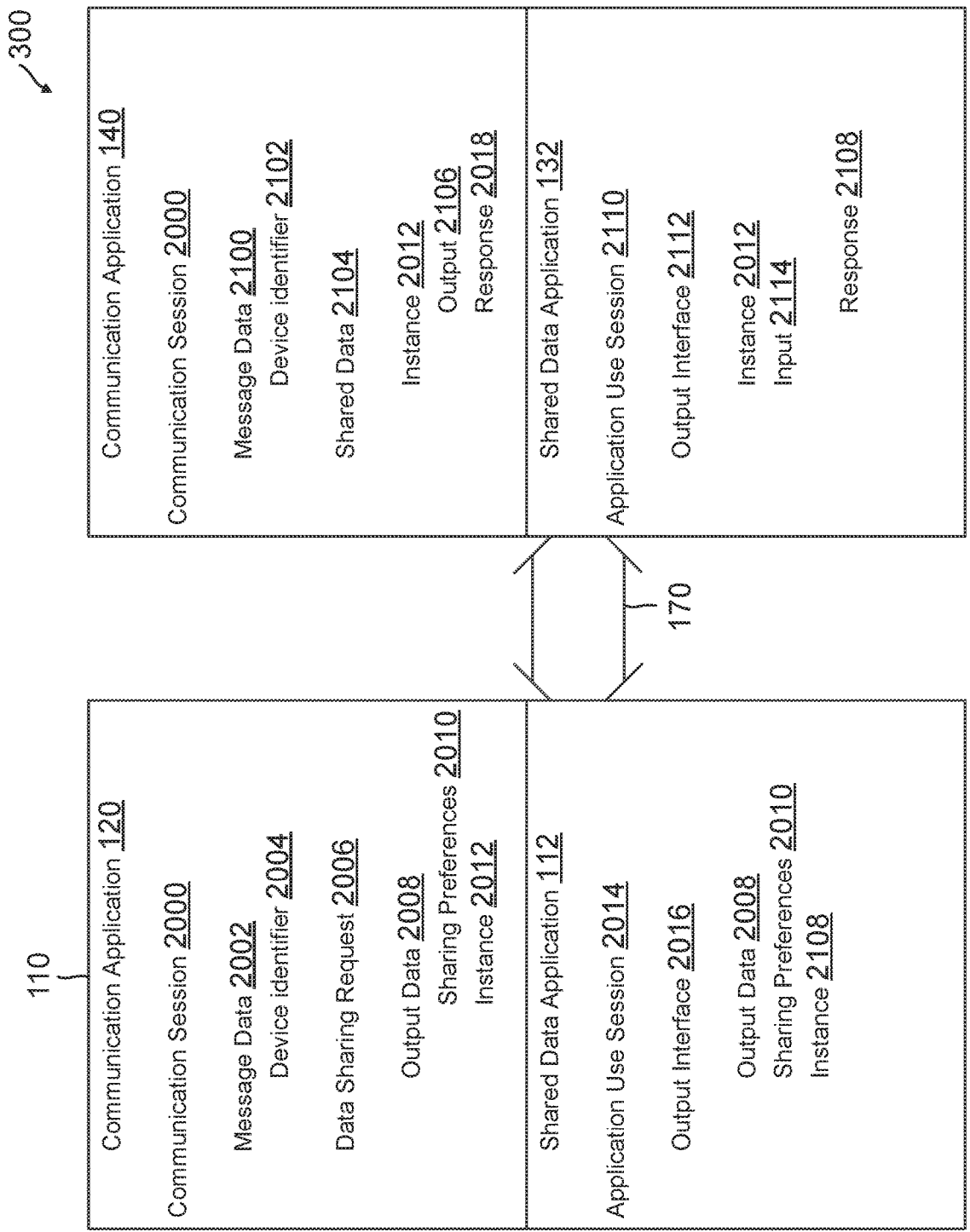
FIG. 3 is an exemplary system environment having a first communication device and a second communication device interacting for shared application data during a communication session, according to an embodiment.

FIG. 3 is an exemplary system environment having a first communication device and a second communication device interacting for shared application data during a communication session, according to an embodiment. Environment 300 of FIG. 3 includes first user device 110 and second user device 130 as discussed in reference to system 100 of FIG. 1. In this regard, first user device 110 executes communication application 120 and shared data application 112, while second user device 130 executes communication application 140 and shared data application 132, all having the processes and features discussed in reference to system 100 of FIG. 1. Additionally, first user device 110 and second user device 130 communicate through network 170 discussed in reference to system 100 of FIG. 1.

In this regard, communication application 120 includes a communication session 2000 having message data 2002 that may be transmitted to second user device 130 using device identifier 2004. Similarly, communication application 140 may communication message data 2100 to first user device 110 through communication session 2000 using device identifier 2102. First user device 110 may further use shared data application 112 to determine an application use session 2014 that includes an output interface 2016 having output data 2008. After selection of data sharing request 2006 on first user device 110 for output data 2008 to share with second user device 130, shared data application 112 may utilize sharing preferences 2010 to provide an instance 2012 to second user device 130 through communication session 2000.

Communication application 140 may receive shared data 2104 from first user device 110 based on instance 2012 generated by shared data application 112 on first user device 110. Shared data 2104 includes instances 2012 having output 2106. Shared data application 132 on second user device 130 may include an application use session 2110 having an output interface 2112. Output interface 2112 may display instance 2012. Additionally, second user device 130 may receive input 2114 to output interface 2112, which may be used to generate a response 2108, which may further be shared with first user device 110.

Figure 4:
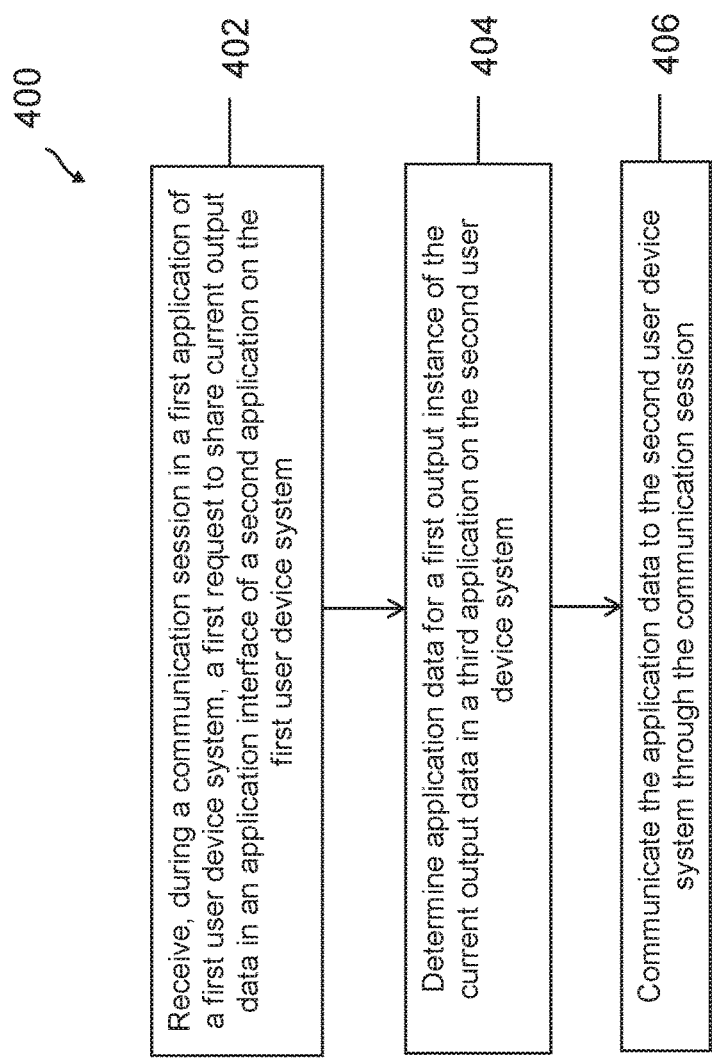
FIG. 4 is a flowchart of an exemplary process for shared application interface data through a device-to-to-device communication session, according to an embodiment.

FIG. 4 is a flowchart of an exemplary process for shared application interface data through a device-to-to-device communication session, according to an embodiment. Note that one or more steps, processes, and methods described herein may be omitted, performed in a different sequence, or combined as desired or appropriate.

At step 402 of flowchart 400, during a communication session in a first application of a first user device system a first request to share current output data in an application interface of a second application on the first user device is received. The communication session may be initialized by one device requesting data exchange with another device through an application and using an identifier for the other device. For example, a voice or video chat may be initialized through calling a phone number, while a messaging session may be started through transmitting a message to a messaging account identifier or address. These communications in the communication session may comprise one of emails, social networking messaging, social networking posts, text messaging, video communication, or a phone call. At least one output component, such as a display device, microphone, and/or speakers, may output the communication session. The first request may be received in the first application through a selection of a plugin icon in a communication interface for the communication session, wherein the plugin icon is associated with an executable process for the second application, for example, to share application data. Prior to receiving the first request during the communication session, the electronic messages transmitted or received by the first user device system may be used to link the first user device system and the second user device system for the executable process, as well as authenticate each system of use of a respective account with an online service provider (e.g., an electronic transaction processing account).

In order to begin sharing of data, the data sharing process may determine the identifier used for data exchange, and may further determine whether that identifier may be used for application data transmission. This may be used to establish a data transfer channel for application data, which may initialize a process to share application data. Thus, application data for a first output instance of the current output data in a third application on the second user device system is determined, at step 404 of flowchart 400. The application data may comprise website data for a website accessed by the second application. For example, the website data may comprise an online shopping session with a digital marketplace hosted by the website. Thus, the output data may comprise item data for an item viewed on the digital marketplace. The output data may also be geolocation specific based on detected device locations. In order to determine the first output instance, a sharing preference for the current output data with the second user device system may be received or determined, wherein the sharing preference designates the application data to share with the second user device system. Prior to determining the application data and/or receiving the first request, the first user device system may determine that the second user device system opens the third application, and may provide a link to share data within the first application on the first user device system.

At step 406 of flowchart 400, the application data is communicated to the second user device system through the communication session, for example, pushed to the second user device system. The second application may comprise an electronic transaction processing application that accesses an online marketplace, and thus, after transmitting the application to the third application on the second user device system, the operations may further comprise receiving a transaction processing request and processing the request. In such embodiments, the transaction processing request may be for a split transaction with the second user device system. In order to process the split transaction, account information for the first user device system and the second user device system (e.g., for a first and second account associated with the respective systems) may be determined and used to process the transaction. Additionally, the first or second user device systems may process a request to add additional users to the transaction that are outside of the communication session, and may message the users and/or utilize device identifiers for the users to add the users to the transaction and notify them of a required payment or benefit. The shared data and/or transaction processing operation may also determine a previous payment provided by a user/account associated with the first user device system to a user/account associated with the second user device system, for example, using a transaction history for the first user device system's user/account. Thus, a payment request to reimburse the first user device system's user/account may be automatically transmitted to the second user device system for at least a partial payment for the split transaction.

In various embodiments, a second request to add a third user device system to the communication session may be received, and the first user device system and second user device system may communicate with the third user device system during the communication system. Additionally, the first output instance may be transmitted to the third user device system. The second user device system may also transmit a second request to change the current output data on the first and/or second user device system, which may cause the respective system to redirect an application interface based on the change. For example, the second request may request that the first and/or second user device system change item preferences and allow shared viewing of items preferences and styles (e.g., color, size, etc.). The request may be processed by the second user device system to determine the requested application data to be shared, output and/or updated in first user device system. For example, the second user device system may be used to select interface options and/or navigate to a new interface, where the second user device system is requested to share that particular instance through the communication session with the first user device system. The second user device system may correspondingly generate new application data, which is pushed to the first user device system during the communication session using the communication session's identifiers. Thus, based on the connection between the first user device system and the second user device system in the communication session and the previously shared data, the devices may exchange or update the application data within each instance of interface data on the respective device.

Figure 5:
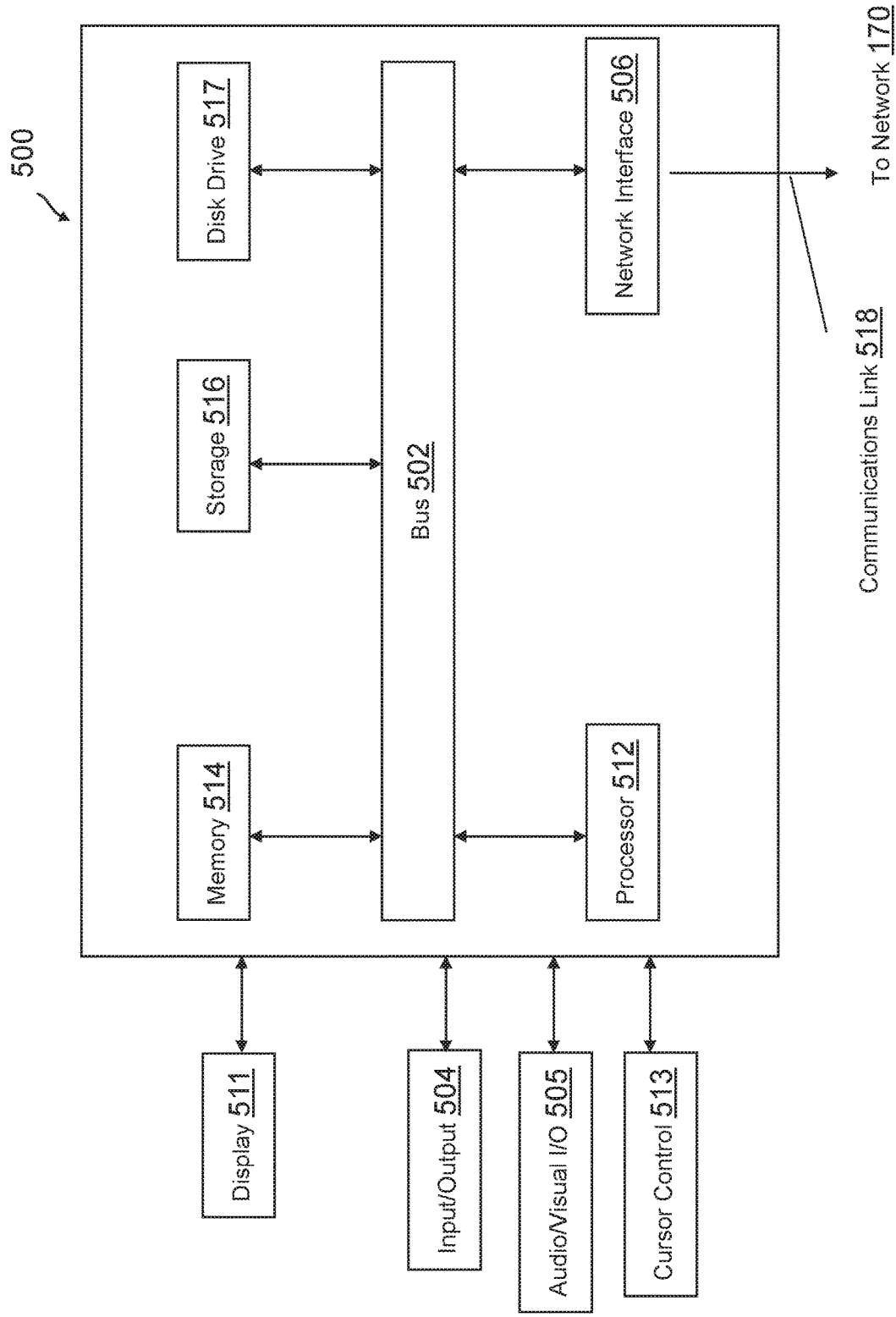
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   authenticating the system in a first application based on a request to share content information from the first application on the system and a first authentication token previously issued to the system by a transaction processor server;
   determining output data to transmit to a user device based in part on the request, wherein the output data comprises a subset of the content information from the first application;
   receiving an authentication of the user device based on a second authentication token previously issued to the user device by the transaction processor server;
   transmitting, via a communication session, the output data to a second application of the user device, wherein in transmitting the output data, the system and the user device share the subset of the content information; and
   modifying the shared content information, wherein the modifying is in response to a change in the shared content information received from the user device and wherein the modifying occurs after the authentication of the user device based on the first authentication token and the second authentication token shared between the system and the user device using a secure shared data process.

2. The system of claim 1, wherein the operations further comprise:
   determining messages shared between the first application of the system and the second application of the user device;
   linking the first application of the system to the second application of the user device based on the shared messages; and
   populating the request to share the content information based on the linking.

3. The system of claim 1, wherein the operations further comprise:
   authenticating the system and the user device for an electronic transaction processing with the transaction processor server during the communication session; and wherein the electronic transaction processing comprises a transaction at an online marketplace involving the system and the user device.

4. The system of claim 3, wherein the operations further comprise:
   processing the electronic transaction, wherein the electronic transaction further includes a purchase of an item included in the shared content information.

5. The system of claim 1, wherein the communication session includes a video chat session between the system and the user device.

6. The system of claim 1, wherein the modifying includes a change in an item to purchase for electronic transaction processing.

7. The system of claim 1, wherein the shared content information includes website data accessed by the system.

8. A method comprising:
   authenticating a system in a first application based on a request to share content information from the first application on the system and a first authentication token previously issued to the system by a transaction processor server;
   determining an output data to transmit to a user device based in part on the request, wherein the output data comprises a subset of the content information from the first application;
   receiving an authentication of the user device based on a second authentication token previously issued to the user device by the transaction processor server;
   transmitting, via a communication session, the output data to a second application of the user device, wherein in transmitting the output data, the system and the user device share the subset of the content information; and
   modifying the shared content information, wherein the modifying is in response to a change in the shared content information received from the user device, and wherein the modifying occurs after the authentication of the user device based on the first authentication token and the second authentication token shared between the system and the user device using a secure shared data process.

9. The method of claim 8, further comprising:
   determining messages shared between the first application of the system and the second application of the user device;
   linking the first application of the system to the second application of the user device based on the shared messages; and
   populating the request to share the content information based on the linking.

10. The method of claim 8, further comprising:
    authenticating the system and the user device for an electronic transaction processing with the transaction processor server during the communication session; and wherein the electronic transaction processing comprises a transaction at an online marketplace involving the system and the user device.

11. The method of claim 10, further comprising:
    processing the electronic transaction, wherein the electronic transaction further includes a purchase of an item included in the shared content information.

12. The method of claim 8, wherein the communication session includes a video chat session between the system and the user device.

13. The method of claim 8, wherein the modifying includes a change in an item to purchase for electronic transaction processing.

14. The method of claim 8, wherein the shared content information includes website data accessed by the system.

15. A non-transitory machine-readable medium having stored thereon machine-readable instructions executable to cause a machine to perform operations comprising:
    authenticating a system in a first application based on a request to share content information from the first application on the system and a first authentication token previously issued to the system by a transaction processor server;
    determining an output data to transmit to a user device based in part on the request, wherein the output data comprises a subset of the content information from the first application;
    receiving an authentication of the user device based on a second authentication token previously issued to the user device by the transaction processor server;
    transmitting, via a communication session, the output data to a second application of the user device, wherein in transmitting the output data, the system and the user device share the subset of the content information; and
    modifying the shared content information, wherein the modifying is in response to a change in the shared content information received from the user device, and wherein the modifying occurs after the authentication of the user device based on the first authentication token and the second authentication token shared between the system and the user device using a secure shared data process.

16. The non-transitory machine-readable medium of claim 15, wherein the operations further comprise:
    determining messages shared between the first application of the system and the second application of the user device;
    linking the first application of the system to the second application of the user device based on the shared messages; and
    populating the request to share the content information based on the linking.

17. The non-transitory machine-readable medium of claim 15, wherein the operations further comprise:
    authenticating the system and the user device for an electronic transaction processing with the transaction processor during the communication session; and wherein the electronic transaction processing comprises a transaction at an online marketplace involving the system and the user device.

18. The non-transitory machine-readable medium of claim 17, wherein the operations further comprise:
    processing the electronic transaction, wherein the electronic transaction further includes a purchase of an item included in the shared content information.

19. The non-transitory machine-readable medium of claim 15, wherein the communication session includes a video chat session between the system and the user device.

20. The non-transitory machine-readable medium of claim 15, wherein the modifying includes a change in an item to purchase for electronic transaction processing.

* * * * *